(12) United States Patent
Drange et al.

(10) Patent No.: US 10,557,953 B2
(45) Date of Patent: Feb. 11, 2020

(54) MOLDED SNAP-IN PLUG AND DEVICE AND METHOD FOR USING SAME

(71) Applicant: PGS Geophysical AS, Oslo (NO)

(72) Inventors: Geir Andre Motzfeldt Drange, Oslo (NO); Bengt Finnøen, Oslo (NO)

(73) Assignee: PGS Geophysical AS, Oslo (NO)

( * ) Notice: Subject to any disclaimer, the term of this patent is extended or adjusted under 35 U.S.C. 154(b) by 53 days.

(21) Appl. No.: 15/626,758

(22) Filed: Jun. 19, 2017

(65) Prior Publication Data

US 2018/0003835 A1   Jan. 4, 2018

Related U.S. Application Data

(60) Provisional application No. 62/357,179, filed on Jun. 30, 2016.

(51) Int. Cl.
*G01V 1/38* (2006.01)
*G01V 1/20* (2006.01)

(52) U.S. Cl.
CPC .............. *G01V 1/201* (2013.01); *G01V 1/208* (2013.01); *G01V 1/38* (2013.01)

(58) Field of Classification Search
CPC .. G01V 1/201; G01V 2001/204; G01V 1/208; G01V 1/38; G01V 1/3817
See application file for complete search history.

(56) References Cited

U.S. PATENT DOCUMENTS

| 4,500,980 A * | 2/1985 | Copeland ............... H02G 15/14 367/154 |
| 4,638,469 A | 1/1987 | Bryant et al. |
| 4,725,990 A | 2/1988 | Zibilich, Jr. |
| 4,736,345 A | 4/1988 | Keckler et al. |
| 5,058,080 A | 10/1991 | Siems et al. |
| 5,561,640 A | 10/1996 | Maciejewski |
| 5,883,856 A | 3/1999 | Carroll et al. |
| 5,883,857 A | 3/1999 | Pearce |
| 5,943,293 A | 8/1999 | Luscombe et al. |

(Continued)

FOREIGN PATENT DOCUMENTS

| EP | 2293115 | 3/2011 |
| GB | 1497737 A | 1/1978 |

(Continued)

OTHER PUBLICATIONS

European Search Report dated Nov. 7, 2017 for European patent application No. 17178108.1, 10 pages.

*Primary Examiner* — Ian J Lobo

(57) ABSTRACT

A harness plug and methods of use. Example devices include an arcuate portion and a lateral portion disposed at an outer periphery of the arcuate portion. The arcuate portion is configured to engage with arcuate portion of a hole within a spacer. A method of using the harness plug includes molding a harness plug about a portion of a cable bundle and inserting the cable bundle into an arcuate portion of a hole in the spacer through a lateral portion of the first hole. The harness plug is pressed into the arcuate portion of a hole in the spacer. A streamer spacer for use with the harness plug includes a hole having a portion having an arcuate shape and a second portion lateral to and abutting the arcuate portion and extending to a periphery of an elongate body of the streamer spacer.

22 Claims, 7 Drawing Sheets

(56) References Cited

U.S. PATENT DOCUMENTS

| | | |
|---|---|---|
| 6,009,042 A | 12/1999 | Workman et al. |
| 6,229,706 B1 | 5/2001 | Cook et al. |
| 6,229,760 B1 | 5/2001 | Ambs |
| 6,337,636 B1 | 1/2002 | Page et al. |
| 6,477,111 B1 | 11/2002 | Lunde et al. |
| 6,612,886 B2 | 9/2003 | Cole, Jr. |
| 6,816,082 B1 | 11/2004 | Laborde |
| 6,839,302 B2 | 1/2005 | Austad et al. |
| 6,879,546 B2 | 4/2005 | Halvorsen et al. |
| 6,992,951 B2 | 1/2006 | O'Brien et al. |
| 7,366,055 B2 | 4/2008 | Roennekleiv et al. |
| 7,483,335 B2 | 1/2009 | Oldervoll et al. |
| 7,622,706 B2 | 11/2009 | Maas |
| 8,094,519 B2 | 1/2012 | Lagakos et al. |
| 8,115,651 B2 | 2/2012 | Camwell et al. |
| 8,358,560 B2 | 1/2013 | Muyzert et al. |
| 8,520,469 B2 | 8/2013 | Ronnow et al. |
| 8,998,535 B2 | 4/2015 | Stenzel et al. |
| 9,019,797 B2 | 4/2015 | Goujon |
| 9,038,765 B2 | 5/2015 | Goujon et al. |
| 9,176,254 B2 | 11/2015 | Johnstad |
| 9,217,805 B2 | 12/2015 | Welker et al. |
| 2007/0193768 A1 | 8/2007 | Howe |
| 2010/0165792 A1 | 7/2010 | Stenzel et al. |
| 2010/0206586 A1 | 8/2010 | Decker et al. |
| 2012/0069706 A1 | 3/2012 | Goujon et al. |
| 2012/0081994 A1 | 4/2012 | Husom et al. |
| 2012/0250457 A1 | 10/2012 | Rickert et al. |
| 2013/0285828 A1 | 10/2013 | Yoon et al. |
| 2014/0029377 A1 | 1/2014 | Mellier et al. |
| 2014/0104981 A1 | 4/2014 | Duboue et al. |
| 2014/0307524 A1 | 10/2014 | Crice et al. |
| 2014/0376329 A1 | 12/2014 | Aaker et al. |
| 2015/0063065 A1 | 3/2015 | Bagaini et al. |
| 2015/0089784 A1 | 4/2015 | Maples et al. |
| 2015/0117147 A1 | 4/2015 | Hegge et al. |
| 2015/0121124 A1 | 4/2015 | Hillesund et al. |
| 2015/0226554 A1 | 8/2015 | Eick et al. |
| 2015/0369945 A1 | 12/2015 | Drange |

FOREIGN PATENT DOCUMENTS

| | | |
|---|---|---|
| JP | 2016001521 A | 1/2016 |
| WO | 9953341 | 10/1999 |
| WO | 2015170170 A2 | 11/2015 |
| WO | 2015195939 A1 | 12/2015 |
| WO | 2016007505 A1 | 1/2016 |

* cited by examiner

US 10,557,953 B2

MOLDED SNAP-IN PLUG AND DEVICE AND METHOD FOR USING SAME

CROSS-REFERENCE TO RELATED APPLICATIONS

This application claims the benefit of U.S. Provisional Application Ser. No. 62/357,179 filed Jun. 30, 2016 and titled "Molded Snap-in Plug". The provisional application is incorporated by reference herein as if reproduced in full below.

BACKGROUND

This disclosure is related generally to the field of marine surveying. Marine surveying can include, for example, seismic and/or electromagnetic (EM) surveying, among others. For example, this disclosure may have applications in marine surveying, in which one or more source elements are used to generate wave-fields, and sensors—either towed or ocean bottom—receive energy generated by the source elements and affected by the interaction with the subsurface formation. The sensors thereby collect survey data which can be useful in the discovery and/or extraction of hydrocarbons from subsurface formations.

Some approaches to marine streamer production include pulling wire harnesses through holes in spacers that have been laid out on a table and fixed in place by the marine streamer stress members. The pulling of wire harnesses through all the spacers can be time consuming and can make repair challenging. Examples of marine streamers include seismic and EM streamers, among others. Thus, devices and methods that reduce the labor and complexity of the production of marine streamers would provide a competitive advantage in the art.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

"Rope" shall mean a flexible, axial load carrying member that does not include electrical and/or optical conductors. Such a rope may be made from fiber, steel, other high strength material, chain, or combinations of such materials

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
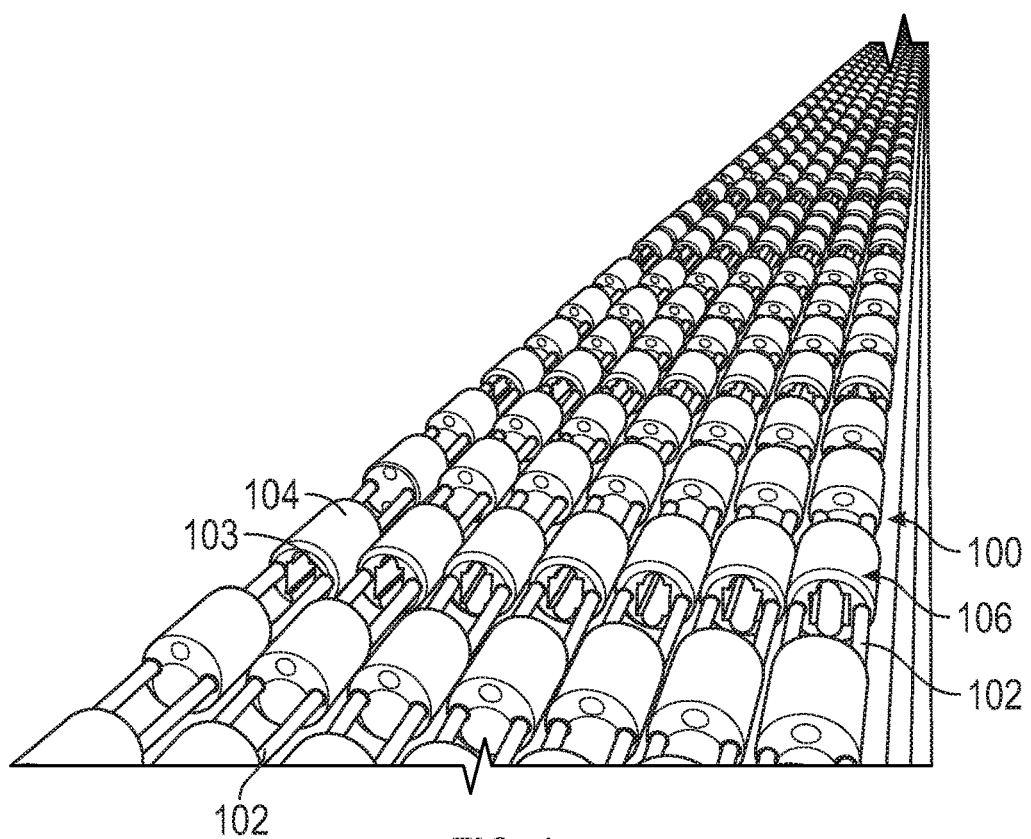
FIG. 1 shows a perspective view of streamer spacer assemblies.

Turning to FIG. 1, FIG. 1 shows a perspective view of spacer assemblies 100 laid out with stress members 102 threaded through holes 103 in spacers 104. Spacers 104 may comprise an elongate body 106 having a length, and holes 103 may pass through the length of the elongate body 106, as described further below. In various embodiments, elongate body 106 of a spacer 104 may be plastic or metallic. For example, in at least some embodiments, elongate body 106 may comprise an engineered thermoplastic such as an ISO-PLAST® engineered polymer from Lubrizol Corporation, Wickliffe, Ohio, USA. In at least some other embodiments, an elongate body 106 may comprise a foam polypropylene, and in still other embodiments may comprise a metal such as aluminum. By way of example, a spacer 104 comprising a metallic elongate body 106 may be used where weight of the spacer 104 is not a concern and high strength is desired. In at least some embodiments, stress members 102 may comprise rope. To further the production of a marine streamer, one or more cable harnesses comprising a plurality of electrical and/or optical cables may be pulled through other holes (not visible in FIG. 1) in spacers 104, as will now be described in conjunction with FIG. 2.

Figure 2:
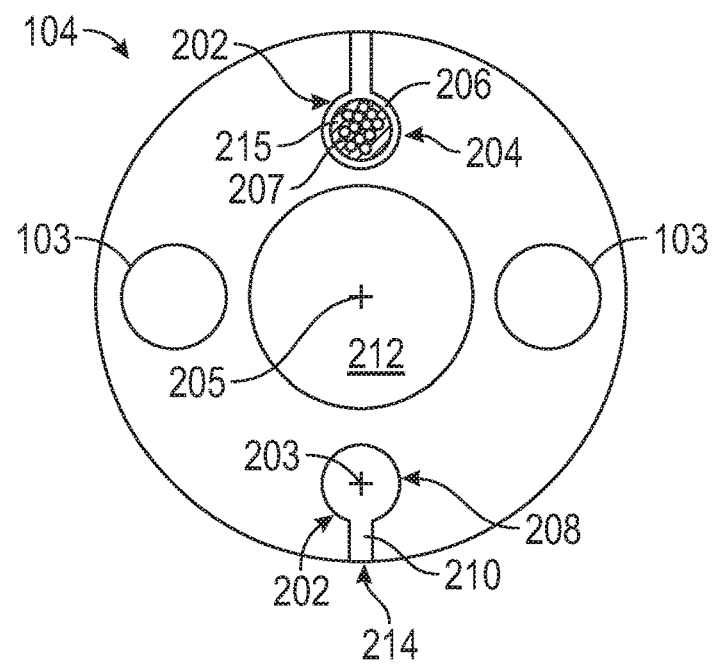
FIG. 2 shows a cross-sectional view of a spacer and harness plug in accordance with an embodiment.

FIG. 2 shows a front elevation view of a spacer 104 in accordance with at least some embodiments. Spacer 104 includes holes 103 through which stress members (not shown in FIG. 2) may thread, as described in conjunction with FIG. 1. Holes 202 may be provided for the passage of one or more cable harnesses 204 through the spacers 104. Holes 202 may be disposed about a peripheral axis 203 which may be disposed at a circumference about a central axis 205. Central axis 205 may define a center of an interior volume 212 of a spacer 104. In particular, in embodiments in accordance with the principles disclosed, a cable harness 204 may comprise a cable bundle 207 and a harness plug 206 disposed about the cable bundle 207 to facilitate assembly of a marine streamer. Plug 206 may include a region 215 bonded to cable bundle 207 as described further in conjunction with FIG. 6. Cable bundle 207 may include one or more electrical, or optical cables, or a combination thereof.

A harness plug 206 may be configured to engage with a hole 202 having a shape complementary to that of the harness plug 206. In the exemplary embodiment of FIG. 2, holes 202 are shown with a "keyhole" like shape with a first portion comprising an arcuate shape, e.g. arcuate portion 208 and a second portion lateral to and abutting the arcuate portion 208, e.g. a lateral portion 210, and extending to a periphery 214 of the elongate body 106. In other words, in at least some embodiments, a lateral portion of a harness plug, e.g. lateral portion 512 (FIG. 5) may be configured to engage a complementary slot in a keyhole-shaped hole disposed in a spacer 104 (FIG. 2). In other embodiments, different shapes may be used. In at least some embodiments, arcuate portion 208 may be circular in shape. And in at least some embodiments, lateral portion 210 may comprise a slot portion (or, simply slot) extending along a length of the elongate body 106. Further, while two holes 202 are shown in the embodiment in FIG. 2, in other embodiments a single hole 202 may be used, and in still other embodiments, more than two holes 202 may be used. In at least some embodiments, the two or more holes may have a keyhole shape. In still other embodiments, at least one of the two or more holes 202 may have a circular shape without a lateral portion (not shown in FIG. 2).

Figure 3:
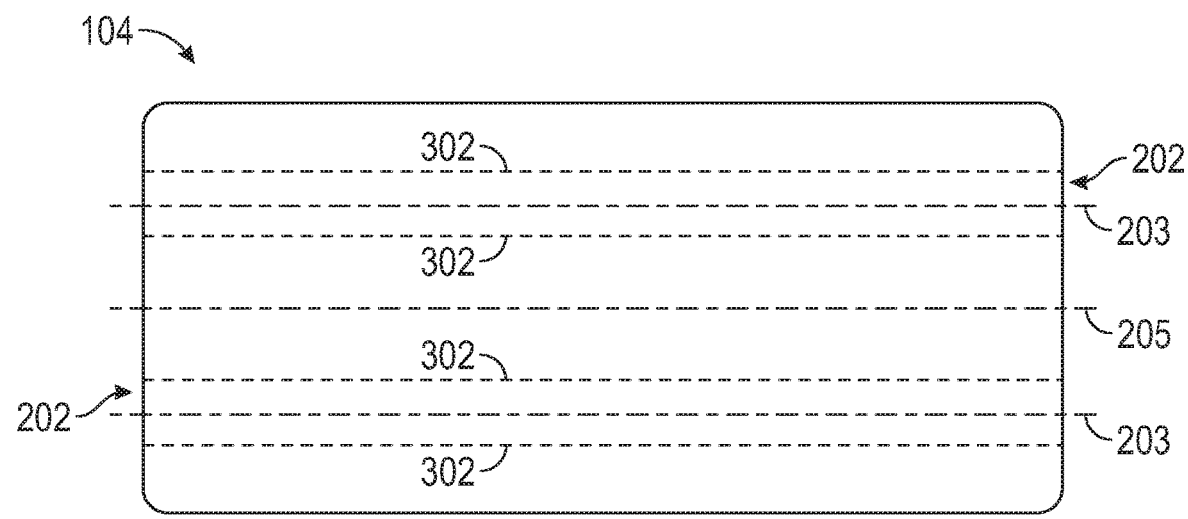
FIG. 3 shows a side elevation view of a spacer in accordance with an embodiment.
Figure 4:
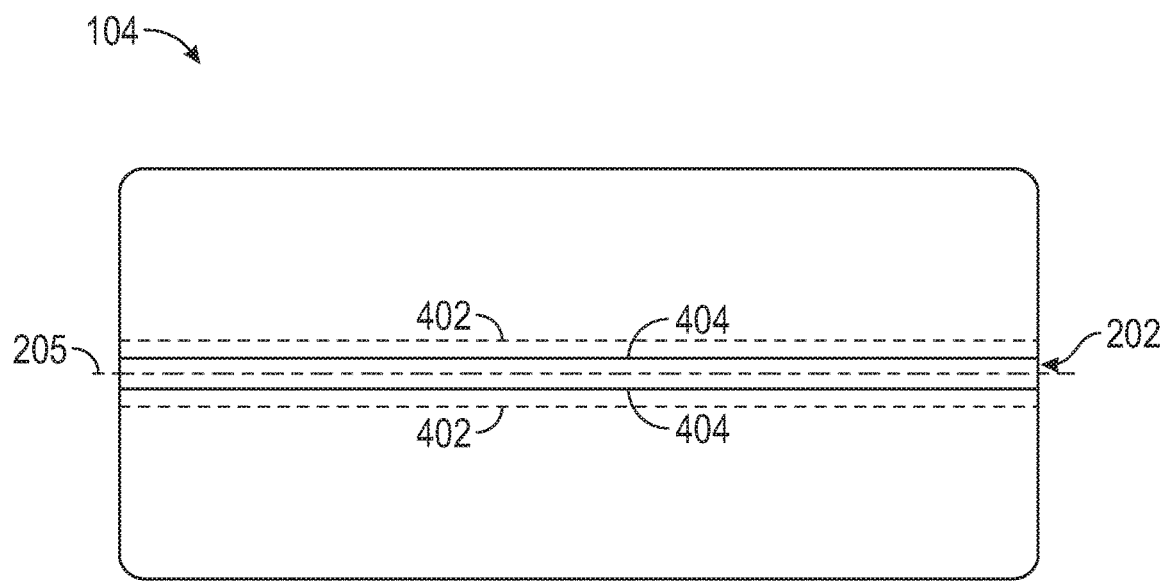
FIG. 4 shows a top view of a spacer in accordance with an embodiment.

The arrangement of holes 202 and in relation to elongate body 106 may be further appreciated by referring to Figured 3 and 4 which respectively show a side elevation view, and a top view of a spacer 104, in accordance with at least some embodiments. Similar to FIG. 2, the spacer 104 in FIG. 3 includes two holes 202. As would be appreciated by those skilled in the art having the benefit of the disclosure, dashed lines 302 represent the maximum extent of arcuate portion 208 (FIG. 2). Similarly, the maximum extent of arcuate portion 208 is represented by dashed lines 402 (FIG. 4) and the edges of lateral portion 210, (FIG. 2) are represented by solid lines 404. For ease of illustration, interior volume 212 (FIG. 2) is omitted in the views of FIGS. 3 and 4.

Figure 5:
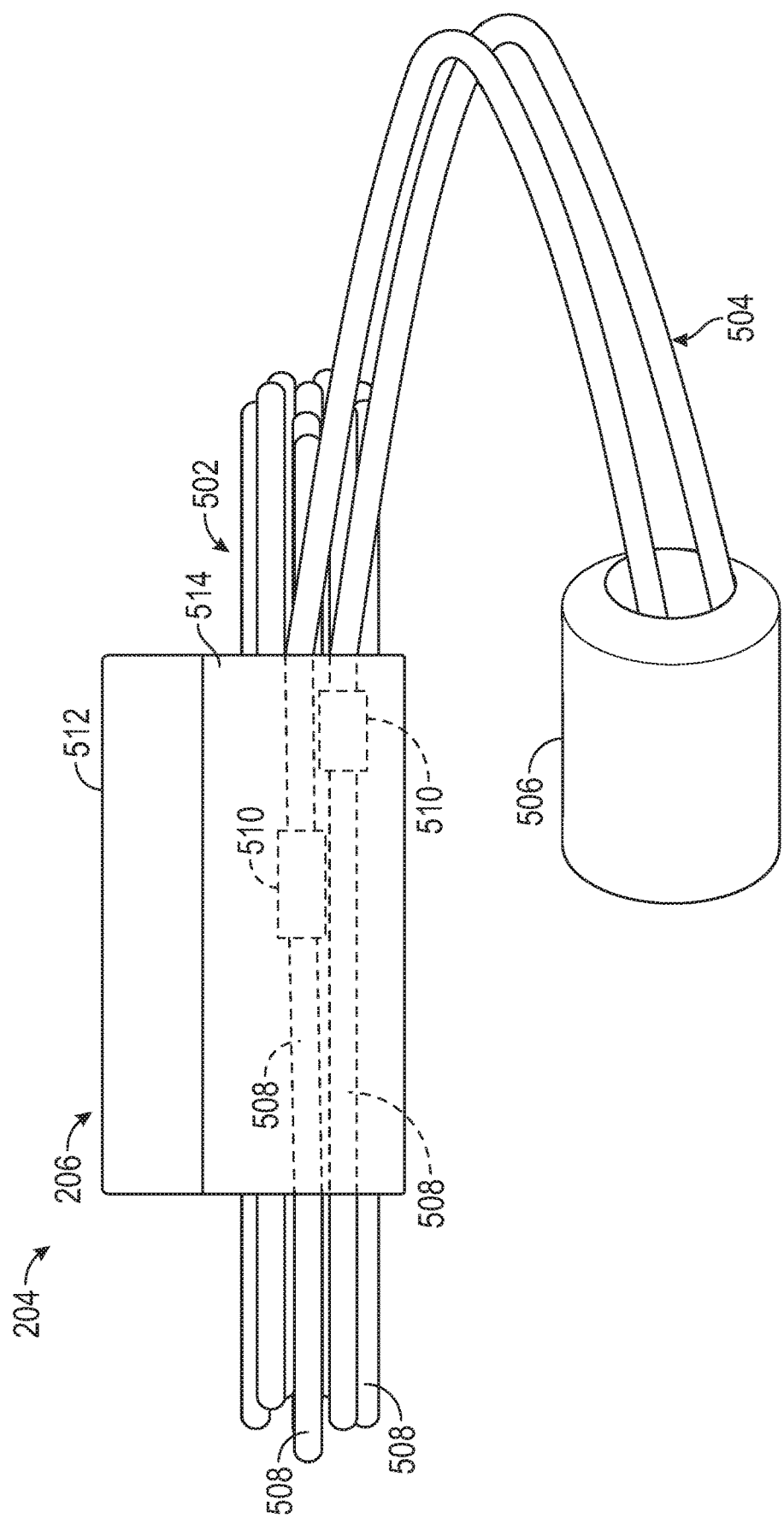
FIG. 5 shows a side view of a portion of a cable harness in accordance with an embodiment.
Figure 6:
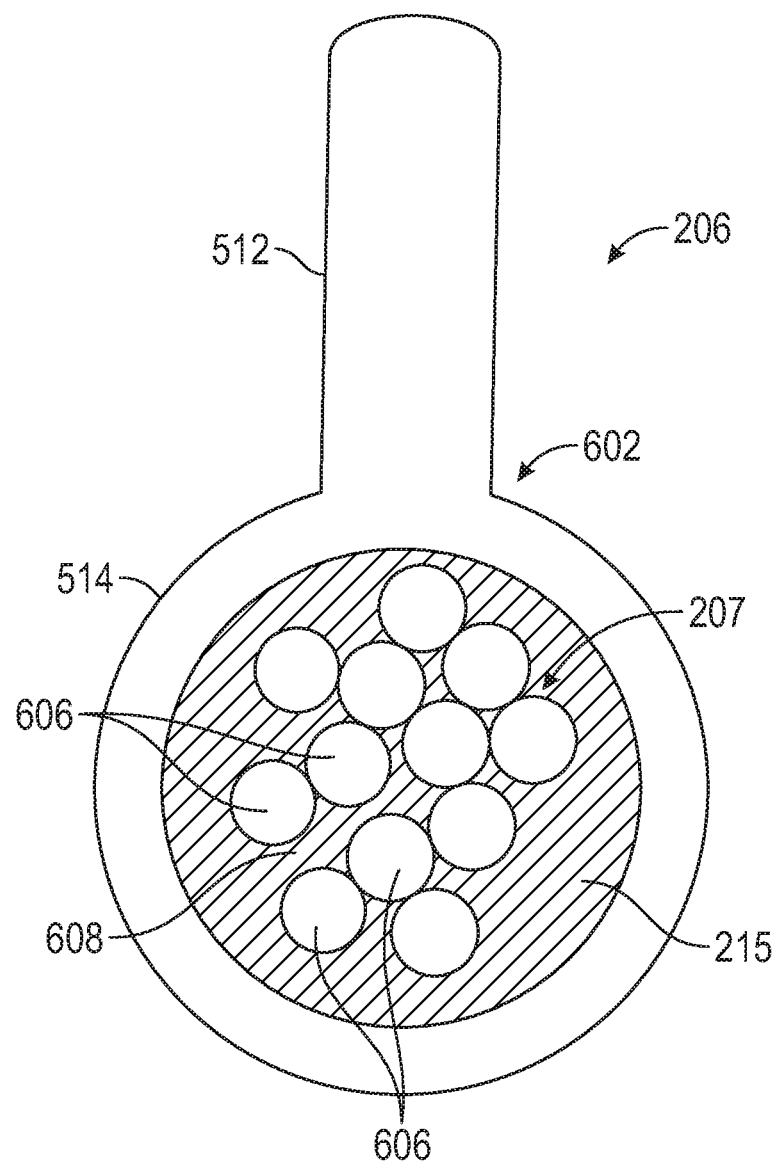
FIG. 6 shows a cross-sectional view of a harness plug in accordance with an embodiment.

FIG. 5 shows a side elevation view of a portion of cable harness 204 including a harness plug 206 and a portion 502 of a cable bundle 207. Harness plug 206 may be molded over the cable bundle portion 502 wherein the material forming the harness plug 206 binds to the cables comprising cable bundle 207, e.g. cables 504, 508, 606 (FIG. 6), and also fills any interstices, e.g. interstices 608 (FIG. 6), that might subsist between the cables. In this way, harness plug 206 may form a unitary structure with and watertight seal about the portion 502 of cable bundle 507 comprising one or more cables e.g. cables 504, 508, 606 (FIG. 6). Additionally, cable splices may be embedded within harness plug 206. For example, a cable harness 204 may include electrical or optical cables, or a combination of electrical and optical cables for communicating data from a sensor to electrical circuitry for communicating the data along the marine streamer to a survey vessel. Thus, signal cables 504 from a sensor 506 may be spliced to cables 508 at splices 510. Cable 508 may be a data cable or, alternatively, may be another sensor signal cable. Splices 510 may be fabricated by soldering, or ultrasonic welding, if a wire cable, or an optical fusion splice if a cable comprises an optical fiber. As would be appreciated by those skilled in the art having the benefit of the disclosure, a sensor 506 may be any sensor used in conjunction with a marine survey such as a hydrophone, geophone or other fluid particle motion sensor, such as an accelerometer. In at least some embodiments, when a cable harness 204 is incorporated within a marine streamer comprising a spacer assembly 100 (FIG. 1), a sensor 506 may be disposed within the interior volume 212 (FIG. 2) of a spacer 104. Harness plug 206 may comprise a lateral portion 512 that is configured to engage with a lateral portion 210 (FIG. 2) of a hole 202, and an arcuate portion 514 configured to engage with arcuate portion 208 of a hole 202 (FIG. 2).

The relationship of the lateral portion 512 and arcuate portion 514 of a harness plug 206 is shown in the cross-sectional view in FIG. 6. Lateral portion 512 is disposed at periphery 602 of arcuate portion 514. In at least some embodiments, harness plug 206 may comprise a single unit of a molded polymer, such as a polyamide plastic, for example. Further, in at least some alternative embodiments, the lateral portion 512 may be omitted wherein the harness plug 206 may comprise a cylindrical form in which arcuate portion 514 may have a circular form in cross-section. As described above, a harness plug 206 may comprise a molded material that includes a region 215 bonded to the cables 606 within a cable bundle 207 and filling interstices, e.g. interstice 608, between cables 606. In at least some embodiments, cables 606 may comprise electrical cables, optical cables, or a combination thereof.

Figure 7:
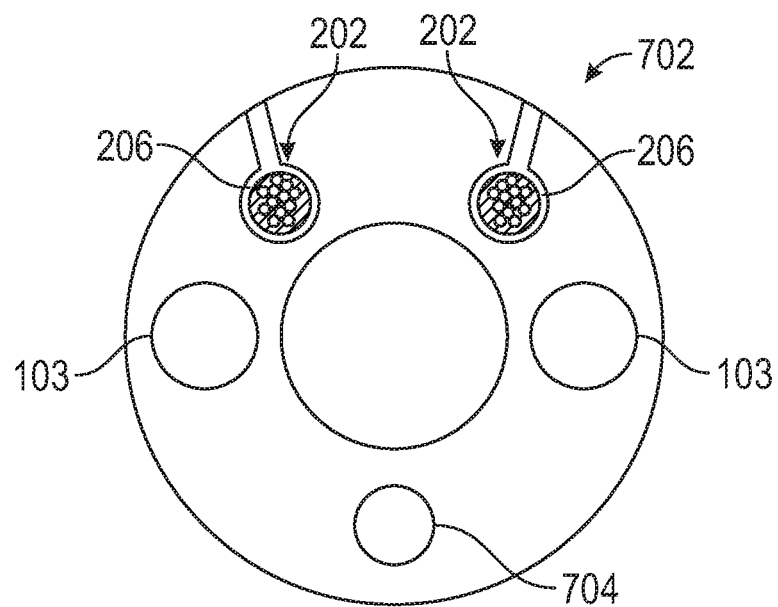
FIG. 7 shows a cross-sectional view of a spacer in accordance with an embodiment.

FIG. 7 shows a spacer 702 in accordance with at least some other exemplary embodiments. Spacer 702 may include two holes 202 configured to receive harness plugs 206. Spacer 702 may further include a hole 704 configured for the passage of a wire bundle (not shown in FIG. 7) without the use of a harness plug. Similar to a spacer 104 (FIGS. 1 and 2), spacer 702 may include holes 103 for the passage of a stress member 102 (FIG. 1).

Figure 8:
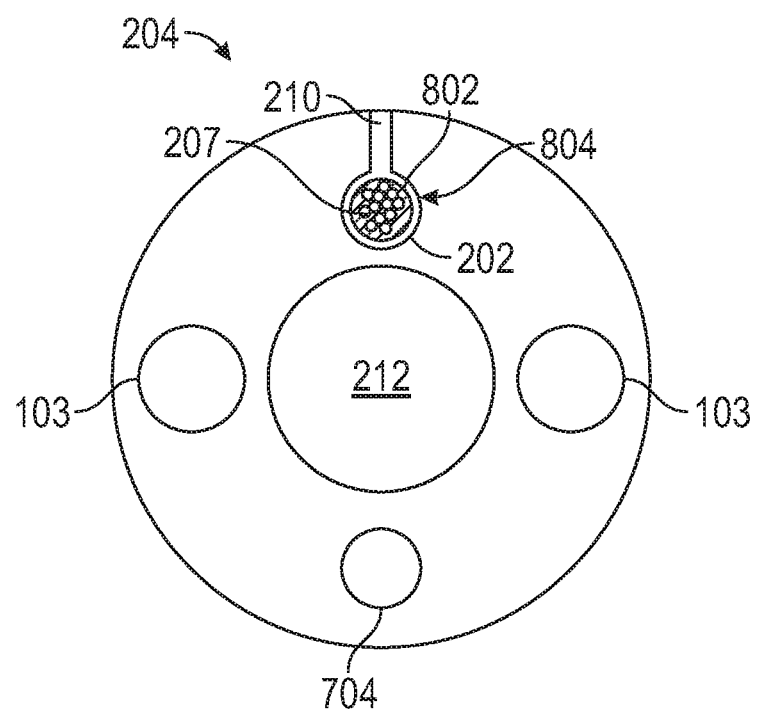
FIG. 8 shows a cross-sectional view of a spacer in accordance with an embodiment.

FIG. 8 shows a spacer 104 and harness plug 802 in accordance with at least some further embodiments. Harness plug 802 may include an arcuate portion 804 but omit a lateral portion. As described further in conjunction with FIG. 10, lateral portion 210 may be used to thread the cables within a cable bundle 207 into a hole 202 (shown filled by harness plug 802) in spacer 104 prior to fitting the harness plug 807. Further, as described in conjunction with FIG. 10, harness plugs, e.g. harness plugs 206 (FIG. 2), 802 may engage with a complementary hole in spacer 104 without the use of an adhesive. In at least some embodiments a harness plug 206 (FIG. 2), 802 may be press fit into a hole 202 without the use of an adhesive.

Figure 9A:
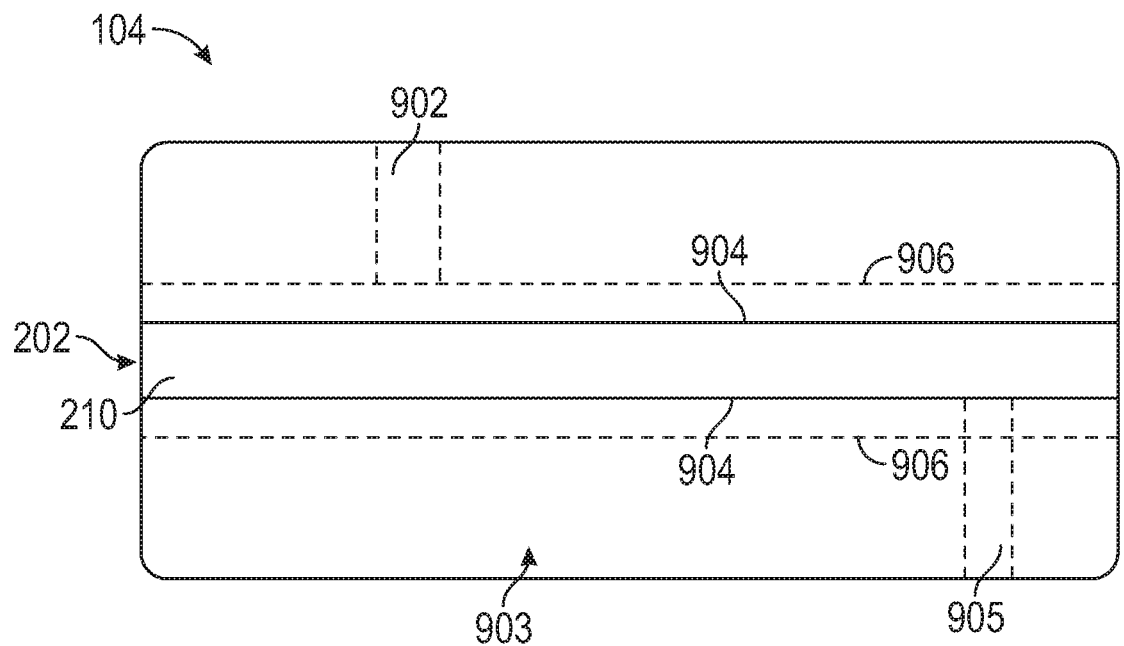
FIGS. 9A and 9B show a top view and cross-sectional elevation view, respectively, of a spacer in accordance with an embodiment.
Figure 9B:
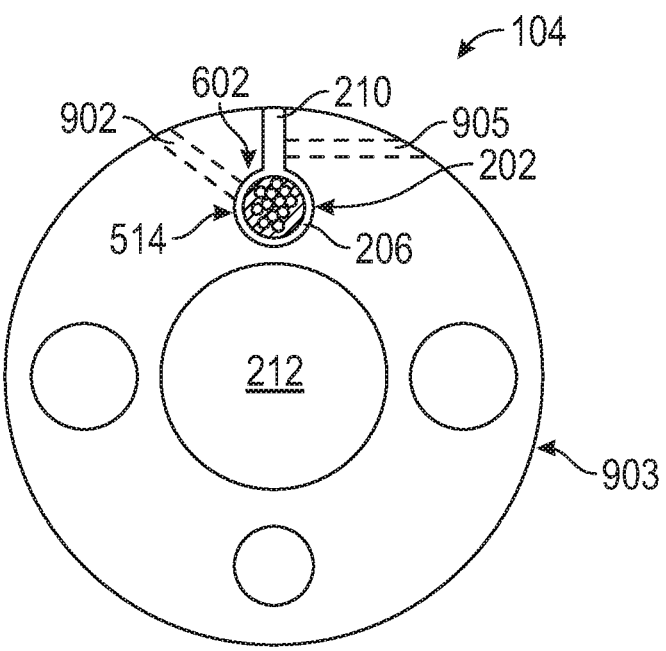

In at least some embodiments, a pin or screw may be used to secure a harness plug in the spacer. Thus, a hole may be provided to accommodate such a pin or screw, as illustrated in FIGS. 9A and 9B. FIG. 9A shows a top view of a spacer 104 in accordance with such an embodiment. As in FIGS. 2 and 8, spacer 104 may have a lateral portion 210. Solid lines 904 represent the edges of lateral portion 210, and the maximum extent of arcuate portion 208 of a hole 202 (FIG. 2) is represented by dashed lines 906. For ease of illustration, interior volume 212 is not shown in FIG. 9A. A hole 902 may be provided to accommodate a pin or screw (not shown in FIGS. 9A, 9B) to engage with a harness plug (e.g. harness plug 206, 802, not shown in FIG. 9A). FIG. 9B shows a cross-sectional view of spacer 104 having a hole 902 disposed therein passing from outer surface 903 to periphery 602 of hole 202 to accommodate a fastening device such as a screw or pin to engage with arcuate portion 514 of harness plug 206. Alternatively, or in at lease some embodiments additionally, a hole 905 may be provided wherein the screw or pin engages with lateral portion 210. In at least some embodiments, holes 902, 905 may be threaded (not shown in FIGS. 9A, 9B) to accommodate a screw, such as a set screw. In other words, holes 902, 905 may comprise threads formed on an interior surface thereof (not shown in FIG. 9A, 9B) which are configured to retain a screw disposed within the holes.

Figure 10:
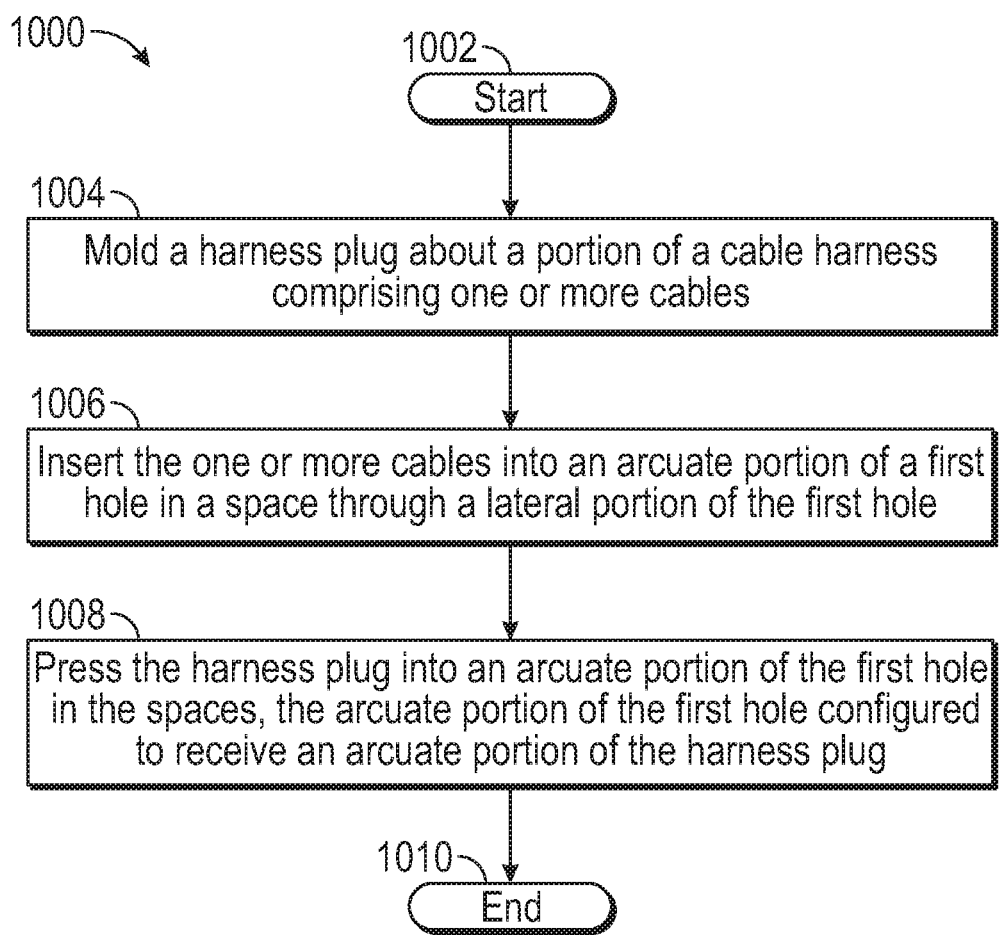
FIG. 10 shows a flow chart of a method in accordance with an embodiment.

Turning now to FIG. 10, a flow chart of a method 1000 for deploying a cable bundle within a spacer is shown. Method 1000 may be used to deploy a cable bundle in conjunction with, for example, a spacer 104 or a spacer 702, using a harness plug (e.g. a harness plug 206) in accordance with at least some embodiments. Method 1000 starts at block 1002. In block 1004, a harness plug is molded about a portion of a cable bundle comprising one or more cables. The one or more cables are inserted into an arcuate portion of a first hole in a spacer (e.g. hole 202, FIG. 2) through a lateral portion of the first hole, such as a lateral portion 210 (FIGS. 2, 8 and 9A, 9B), in block 1006. The lateral portion of the hole may be used in this way in conjunction with a harness plug having a complementary lateral portion, e.g. a lateral portion 512 (FIG. 5), or a harness plug comprising only an arcuate portion. In block 1008 the harness plug is pressed into the arcuate portion of the first hole in the spacer. The harness plug may be configured to engage with the hole, without the use of an adhesive. Further, as described above, a second hole may be provided in the spacer passing from an outer surface of the spacer (e.g. outer surface 903 (FIGS. 9A, 9B) traversing the spacer to the arcuate portion of the first hole, e.g. hole 902 (FIG. 9A, 9B). Alternatively, a second hole may be provided in the spacer traversing the spacer to the lateral portion of the first hole, e.g. hole 905 (FIGS. 9A, 9B). The second hole may be configured to retain a fastening device such as a pin or screw. The fastening device may engage with the harness plug to further restrain the harness plug in the spacer, for example. Method 1000 ends at block 1010.

The above discussion is meant to be illustrative of the principles and various embodiments of the present invention. Numerous variations and modifications will become apparent to those skilled in the art once the above disclosure is fully appreciated. For example, spacer assemblies incorporating cable harnesses and harness plugs in accordance with the principles of the disclosed embodiments may have any number of harness plugs. It is intended that the following claims be interpreted to embrace all such variations and modifications.

What is claimed is:

1. A streamer spacer comprising:
an elongate body having a length;
one or more holes passing through the length of the elongate body; and
a first hole passing through the length of the elongate body, the shape of the first hole is a keyhole shape and includes:
a first portion having an arcuate shape; and
a second portion lateral to and abutting the arcuate shape of the first portion and extending to a periphery of the elongate body.

2. The streamer spacer of claim 1 wherein the arcuate shape of the first hole comprises a circular curve and the second portion comprises a slot portion extending from the circular curve to the periphery of the elongate body.

3. The streamer spacer of claim 1 wherein the elongate body comprises an engineered thermoplastic.

4. The streamer spacer of claim 1 wherein at least two holes comprise:
a third having an arcuate shape; and
a fourth portion abutting the arcuate shape of the third portion and extending to the periphery of the elongate body.

5. The streamer spacer of claim 4, wherein at least one of the at least two holes has a keyhole shape.

6. The streamer spacer of claim 1 wherein a second hole has a circular shape.

7. The streamer spacer of claim 1 further comprising an interior volume disposed about a central axis of the elongate body.

8. The streamer spacer of claim 1 wherein:
the elongate body further comprises an outer surface, and further comprising:
a hole passing from the outer surface to a periphery of the arcuate shape of the first hole, the hole passing from the outer surface of the elongate body configured to retain a device for securing a harness plug in the first hole.

9. The streamer spacer of claim 8 wherein the device for securing the harness plug in the first hole comprises a device selected from the group consisting of: a screw; and a pin.

10. A cable harness comprising:
a cable bundle comprising one or more cables;
a plurality of streamer spacers, each streamer spacer comprising:
an elongate body having a length; and
a first hole passing through the length of the elongate body, the shape of the first hole is a keyhole shape including a first portion having an arcuate shape, and a second portion lateral to and abutting the arcuate shape of the first portion and extending to a periphery of the elongate body;
one or more harness plugs, each harness plug is molded about the cable bundle and forms a watertight seal about the cable bundle; and
each harness plug has an arcuate portion having a curved boundary, the arcuate portion engaged with the arcuate shape of the first hole of one of the plurality of streamer spacers.

11. The cable harness of claim 10 wherein at least one of the one or more harness plugs further comprises a lateral portion disposed at an outer periphery of the arcuate portion.

12. The cable harness of claim 11 wherein the lateral portion is engaged with the second portion of the keyhole shape of the first hole of one of the plurality of streamer spacers.

13. The cable harness of claim 10 wherein each harness plug comprises a polyamide plastic.

14. A harness plug comprising:
an arcuate portion that defines an arcuate shape; and
a lateral portion disposed at an outer periphery of the arcuate portion, and the lateral portion extends outward from the arcuate portion, wherein the arcuate portion is configured to engage with an arcuate portion of a hole within a spacer; and
wherein the harness plug is configured to form a watertight seal about a portion of a cable harness comprising one or more cables.

15. The harness plug of claim 14 wherein the arcuate portion and the lateral portion comprise a polyamide plastic.

16. The harness plug of claim 14 wherein the harness plug is configured to engage with the hole within the spacer without the use of an adhesive.

17. A method for deploying a cable bundle in a spacer comprising:
molding a harness plug about a portion of the cable bundle comprising one or more cables;

inserting the one or more cables into an arcuate portion of a first hole in the spacer through a lateral portion of the first hole; and pressing the harness plug into the arcuate portion of the first hole in the spacer, the arcuate portion of the first hole configured to receive an arcuate portion of the harness plug.

18. The method of claim 17 wherein the harness plug is pressed into the first hole without the use of an adhesive.

19. The method of claim 17 further comprising:

inserting a fastening device in a second hole in the spacer, the second hole traversing the spacer from an outer surface of the spacer to the arcuate portion of the first hole; and engaging the harness plug with the fastening device.

20. The method of claim 17 further comprising:

inserting a fastening device in a second hole in the spacer, the second hole traversing the spacer from an outer surface of the spacer to a lateral portion of the first hole; and engaging the harness plug with the fastening device.

21. The method of claim 19 wherein the fastening device comprises a pin.

22. The method of claim 19 wherein:

the fastening device comprises a screw; and the second hole comprises threads formed on an interior surface thereof, the threads configured to retain the screw.

\* \* \* \* \*